(12) United States Patent
Verbakel et al.

(10) Patent No.: US 7,133,334 B2
(45) Date of Patent: Nov. 7, 2006

(54) METHOD AND DEVICE FOR INTERFACING VARIABLE-RATE SAMPLED DIGITAL AUDIO INFORMATION TO A STRING OF UNIFORM-SIZED BLOCKS, AND A UNITARY MEDIUM SO PRODUCED BY A WRITE-INTERFACING

(75) Inventors: Johannes M. M. Verbakel, Eindhoven (NL); Johannes J. Mons, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 391 days.

(21) Appl. No.: 10/680,458

(22) Filed: Oct. 7, 2003

(65) Prior Publication Data

US 2004/0208113 A1    Oct. 21, 2004

Related U.S. Application Data

(62) Division of application No. 09/341,911, filed as application No. PCT/IB98/01872 on Nov. 24, 1998, now Pat. No. 6,661,762.

(30) Foreign Application Priority Data

Nov. 29, 1997    (EP) ................................ 097203744

(51) Int. Cl.
  *G11B 15/52*    (2006.01)

(52) U.S. Cl. .................................................. 369/47.22
(58) Field of Classification Search .................... None
  See application file for complete search history.

(56) References Cited

U.S. PATENT DOCUMENTS

| 5,323,396 | A | | 6/1994 | Lokhoff |
| 5,452,006 | A | * | 9/1995 | Auld ..................... 375/240.26 |
| 5,606,618 | A | | 2/1997 | Lokhoff et al. |
| 5,648,948 | A | * | 7/1997 | Itoh et al. .................. 369/47.2 |
| 5,652,824 | A | * | 7/1997 | Hirayama et al. |
| 5,715,224 | A | * | 2/1998 | Fujinami |
| 6,289,306 | B1 | | 9/2001 | Van Der Vleuten et al. |
| 6,535,845 | B1 | | 3/2003 | Bruekers et al. |
| 6,778,965 | B1 | | 8/2004 | Bruekers et al. |

FOREIGN PATENT DOCUMENTS

EP    0795870    *    9/1997

\* cited by examiner

*Primary Examiner*—Paul W. Huber

(57) ABSTRACT

For mapping sampled digital audio information onto a linear physical mapping space that is partitioned in a string of uniform-sized blocks, in particular, for variable-rate coded audio information that is distributed over successive audio units which are each composed from one or more audio packets, each block is supplemented with a block header for indicating an actual content of the block in question with respect to any constituent packet of the audio information.

6 Claims, 5 Drawing Sheets

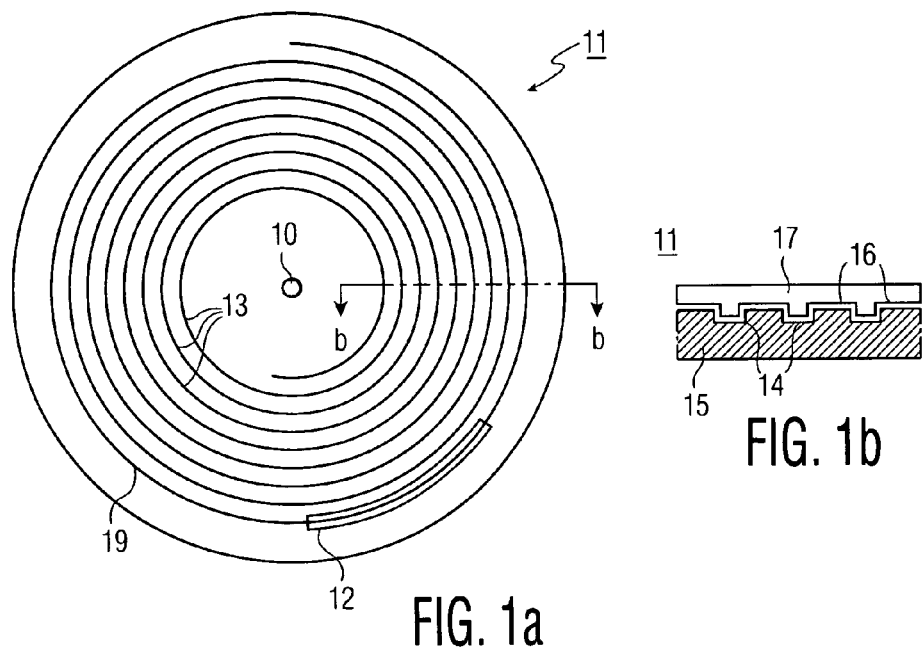
FIG. 1a
FIG. 1b
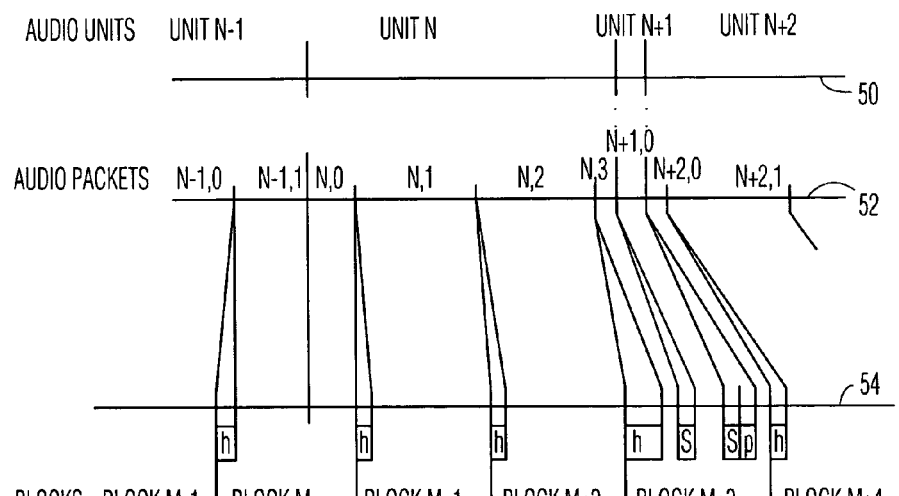
FIG. 4

```
                                                    # bits
audio_mux_stream () {
    for (i=0;<N_audio_blocks; n++)
    {
        audio_block ()                              audio_block_length
    }
} bits
audio_block () {
    audio_block_header ()

for (i=0;<N_packets; i++)
    {
        packet(datatype [i])                        packet_length [i]
    }
}
```

```
                                                    # bits
audio_block_header ( ) {
    non_audio_unit_start                              1 if (non_audio_unit_start=0 ) {
        packet_audio_unit_start                       1
        time_code                                    30
    }
    next_unit                                         4

N_packets                                         3 for (i=0;i<N_packets; i++)
    {
        data_type [i]                                 5
        length [i]                                   11
    }
}
```

FIG. 7

| Data_type | CONTENT |
|---|---|
| 00000-00111 | RESERVED |
| 01000 | NON LOSSLESS CODED DSD 64 Fs STEREO |
| 01001-10101 | RESERVED |
| 10110 | LOSSLESS CODED DSD 48Fs STEREO |
| 10111 | LOSSLESS CODED DSD 48Fs MULTI CHANNEL |
| 11000 | LOSSLESS CODED DSD 64Fs STEREO |
| 11001 | LOSSLESS CODED DSD 64Fs MULTI CHANNEL |
| 11010-11011 | RESERVED |
| 11100 | CD TEXT |
| 11101-11110 | RESERVED |
| 11111 | STUFFING |

FIG. 8

|                          | # bits   | format     | value   |
|--------------------------|----------|------------|---------|
| Audio_Header ( ) {       |          |            |         |
|   N_Packets    | 3        | Uint3      | 1..7    |
|   N_Frame_Starts | 3      | Uint3      | 0..7    |
|   Reserved     | 1        | Uint1      | 0       |
|   Lossless_Coded | 1      | Uint1      |         |
|   for (p =1; p < = N_Packets; p ++) | | | |
|     Packet_Info ( ) [p] | 16 | Packet_Info | |
|   for (f =1; f < = N_Frame_Starts; f++) | | | |
|     Frame_Info ( ) [f] | 24 or 48 | Frame_Info | |
| }                        |          |            |         |

FIG. 9

|                       | # bits | format    | value   |
|-----------------------|--------|-----------|---------|
| Packet_Info [p] {     |        |           |         |
|   Frame_Start | 1    | Uint1     | 1..0    |
|   Reserved  | 1      | Uint1     | 0       |
|   Data_Type [p] | 3  | Data_Type | 2, 3, 7 |
|   Packet_Length [p] | 11 | Uint1 | 1..2045 |
| }                     |        |           |         |

FIG. 10

| VALUE | DEFINITION |
|-------|------------|
| 0 .. 1 | RESERVED |
| 2     | AUDIO PACKET |
| 3     | SUPPLEMENTARY DATA PACKET |
| 4 .. 6 | RESERVED |
| 7     | PADDING |

METHOD AND DEVICE FOR INTERFACING VARIABLE-RATE SAMPLED DIGITAL AUDIO INFORMATION TO A STRING OF UNIFORM-SIZED BLOCKS, AND A UNITARY MEDIUM SO PRODUCED BY A WRITE-INTERFACING

CROSS-REFERENCE TO RELATED APPLICATIONS

This is a divisional application of U.S. patent application Ser. No. 09/341,911, filed Jul. 20, 1999, now U.S. Pat. No. 6,661,762, which is a 371 of PCT/IB98/01872, filed Nov. 24, 1998 which is herein incorporated by reference in its entirety.

BACKGROUND OF THE INVENTION

1. Field of the Invention

The invention relates to a method for mapping sampled digital audio information onto a linear physical mapping space that is partitioned into a string of uniform-sized blocks.

2. Description of the Related Art

The invention relates generally to the field of digital audio encoding, and more specifically to a method for mapping sampled digital audio information onto a linear physical mapping space that is partitioned into a string of uniform-sized blocks. Present state of the art of digital audio encoding is the well-known Compact Disc system with its ramifications. Progress in storage technology and audio encoding technology allows an increase in the amount of audio information on a unitary medium such as conforming to the standard CD dimensions. A particular feature is variable-rate encoding, which, however, requires an easy accessible indicator organization for subsequent read-accessing of the string of Audio Units.

SUMMARY OF THE INVENTION

In consequence, amongst other things, it is an object of the present invention to allow a reader device to straightforwardly recover all information pertaining to an Audio Unit that may have been dispersed over various storage blocks or sectors. Now therefore, according to one of its aspects, the invention is a method for mapping sampled digital audio information onto a linear physical mapping space that is partitioned into a string of uniform-sized blocks. For variable-rate coded audio information that is distributed over successive audio units, each of the successive audio units comprises one or more audio packets, including, in each of said block, a block header for indicating an actual content of the block in question with respect to any constituent packet that contains audio information or contains other information.

The invention also relates to a unitary storage medium produced by practicing such method, and to a reader device for reading a unitary storage medium so produced.

BRIEF DESCRIPTION OF THE DRAWINGS

These and further aspects and advantages of the invention will be discussed more in detail hereinafter with reference to the disclosure of preferred embodiments, and, in particular, with reference to the accompanying drawings, in which:

FIGS. 1a and 1b show a record carrier;

FIG. 4 shows a layout of a linear physical storage space;

FIG. 7 shows a header format;

FIG. 8 shows a table of a data_type specification list;

FIG. 9 shows an audio block header syntax;

FIG. 10 shows a table of a packet information syntax; and

FIG. 11 shows a table of another data type definition.

DESCRIPTION OF THE PREFERRED EMBODIMENTS

Figure 2:
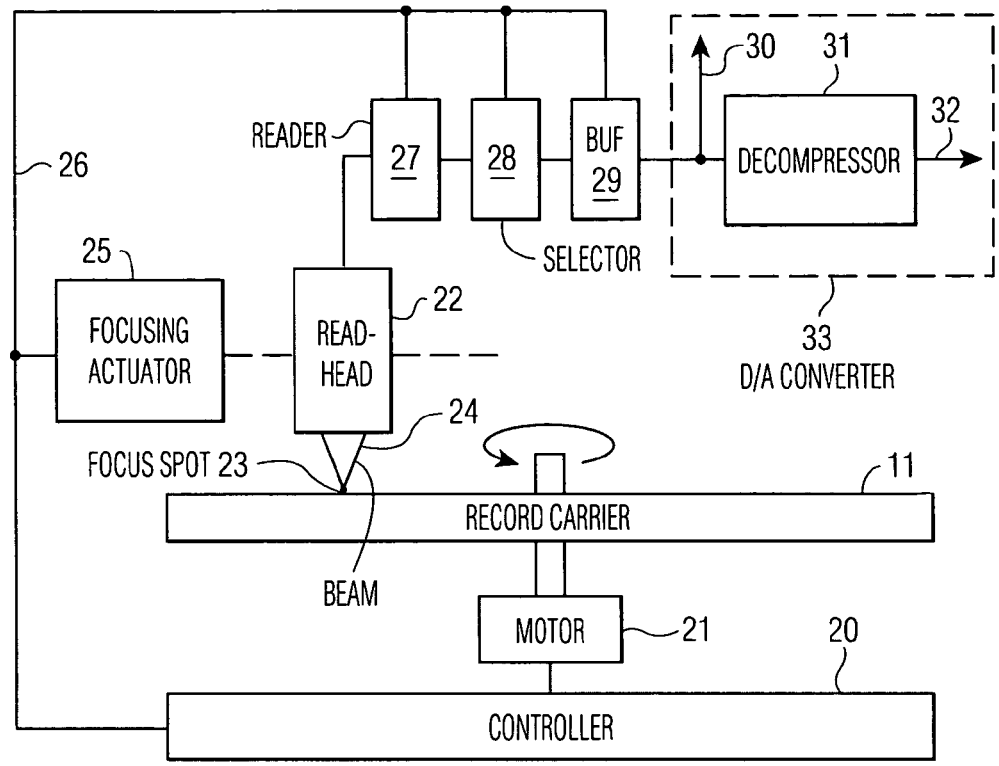
FIG. 2 shows a block diagram of a playback device.

FIG. 1a shows a disc-shaped record carrier 11 with a track 19 and a central hole 10. Track 19 is arranged in a spiral pattern of turns forming substantially parallel tracks on an information layer. The carrier may be an optical disc with a recordable or a prerecorded information layer. Examples of a recordable disc are CD-R, CD-RW, and DVD-RAM, whereas audio CD is a prerecorded disc. Prerecorded discs can be manufactured by first recording a master disc and subsequently pressing consumer discs. Track 19 on the recordable record carrier is indicated by a providing a pre-embossed track structure during manufacture of the blank record carrier. The track may be configured as a pre-groove 14 to enable a read/write head to follow the track 19 during scanning. The information is recorded on the information layer by optically detectable marks along the track, e.g., pits and lands.

FIG. 1b is a cross-section, taken along the line b—b in FIG. 1a, of a recordable record carrier 11, wherein a transparent substrate 15 carries a recording layer 16 and a protective layer 17. The pre-groove 14 may be implemented as an indentation, an elevation, or as a material property deviating from its surroundings.

For user convenience, the audio information on the record carrier has been subdivided into items which usually have a duration of a few minutes, e.g., songs on an album or movements of a symphony. Usually, the record carrier also contains access information for identifying the items, such as in a so-called Table Of Contents (TOC), or included in a file system like ISO 9660 for CD-ROM. The access information may include the playing time and start address for each item, and also further information, like a song title.

The audio information is recorded in digital representation after analog to digital (A/D) conversion. Examples of A/D conversion are PCM 16-bit per sample at 44.1 kHz known from CD audio and 1 bit Sigma Delta modulation at a high oversampling rate e.g. 64×Fs called bitstream. The latter method represents a high quality encoding method, with the choice between high quality decoding and low quality decoding, the latter allowing a simpler decoding circuit. Reference is made in this respect to the publications 'A digital decimating filter for analog-to-digital conversion of hi-fi audio signals', by J. J. van der Kam, document D5 intra (List of Related Documents), and 'A higher order topology for interpolative modulators for oversampling A/D converters', by Kirk C. H. Chao et al, document D6. After A/D conversion, digital audio is compressed to variable bitrate audio data for recording on the information layer. The compressed audio data is read from the record carrier at such a speed, that after decompression substantially the original timescale will be restored when reproducing the audio information continuously. Hence the compressed data must be retrieved from the record carrier at a speed depending on the varying bitrate. The data is retrieved from the record carrier at so-called transfer speed, i.e. the speed of transferring data bytes from the record carrier to a de-compressor. The record carrier may have uniform spatial data density, which gives the highest data storage capacity per unit of area. In such system the transfer speed is proportional to the relative linear speed between the medium and the read/write head. If a buffer is provided before the de-compressor, the actual transfer speed is the speed before that buffer.

FIG. 2 shows a playback apparatus according to the invention for reading a record carrier 11 of the type shown in FIGS. 1a–1b. The device has drive means 21 for rotating record carrier 11 and a read head 22 for scanning the record carrier track. Positioning means 25 affect coarse radial positioning of read head 22. The read head comprises a known optical system with a radiation source for generating a radiation beam 24 that is guided through optical elements and focused to spot 23 on an information layer track. The read head further comprises a focusing actuator for moving the focus of the radiation beam 24 along the optical axis of the radiation beam and a tracking actuator for fine positioning of spot 23 in a radial direction on the center of the track. The tracking actuator may comprise coils for moving an optical element or may be arranged for changing the angle of a reflecting element. The radiation reflected by the information layer is detected by a known detector in the read head 22, e.g. a four-quadrant diode, to generate a read signal and further detector signals including a tracking error and focusing error signals for the tracking and focusing actuators, respectively. The read signal is processed by a reading means 27 to retrieve the data, which reading means are of a usual type for example comprising a channel decoder and an error corrector. The retrieved data is passed to a data selection means 28, to select the compressed audio data for passing on to buffer 29. The selection is based on data type indicators also recorded on the record carrier, e.g. headers in a framed format. From buffer 29, the compressed audio data are passed on to de-compressor 31 as signal 30. This signal may also be outputted to an external de-compressor. De-compressor 31 decodes the compressed audio data to reproduce the original audio information on output 32. The de-compressor may be fitted separately, e.g. in a stand-alone high quality audio digital to analog convertor (D/A convertor), as indicated by dashed rectangle 33 in FIG. 2. Alternatively, the buffer may be positioned before the data selections means. The buffer 29 may be positioned in a separate housing or may be combined with a buffer in the decompressor. The device furthermore has a control unit 20 for receiving control commands from a user or from a host computer not shown, that via control lines 26 such as a system bus is connected to drive means 21, positioning means 25, reading means 27 and data selection means 28, and possibly also to buffer 29 for buffer filling level control. To this end, the control unit 20 may comprise control circuitry, such as a microprocessor, a program memory and control gates, for performing the procedures described below. Control unit 20 may be implemented as a logic circuit state machine.

Audio compression and de-compression of a suitable type are known. Audio may be compressed after digitizing by analyzing the correlation in the signal, and producing parameters for fragments of a specified size. During decompression, the inverse process is used to reconstruct the original signal. If the original digitized signal is reconstructed exactly, the (de-)compression is called lossless, whereas lossy (de)-compression will not reproduce certain details of the original signal which, however, are substantially undetectable by the human ear or eye. Most known systems for audio and video, such as DCC or MPEG, use lossy compression, whereas lossless compression is used for storing computer data. Examples of audio compression and decompression can be found in documents D2, D3 and D4, of which, in particular, the lossless compression of document D2 is suitable for high quality audio.

The data selection means 28 is arranged to discard any stuffing data that had been added during recording. When the control unit 20 is commanded to reproduce an item of audio from the record carrier, the positioning means 25 is controlled to position the reading head on the portion of the track containing the TOC. The starting address for that item is then retrieved from the TOC via the data selection means 28. Alternatively, the contents of the TOC may be read only once and stored in a memory when the disc is inserted in the apparatus. For reproducing the item, the drive means 21 is controlled to rotate the record carrier at the appropriate speed. The required rotation rate may be denoted as such for setting the drive means. Alternatively, the rotation rate may be adjusted through time codes that are stored together with the audio data to indicate the associated replay duration.

To provide continuous reproduction without buffer underflow or overflow, the transfer speed is coupled to the reproduction speed of the D/A converter, i.e., to the bit-rate after decompression. To this end, the apparatus may comprise a reference frequency source for controlling the de-compressor and the rotation rate may be set in dependence on the reference frequency and the speed profile. Alternatively, or additionally, the rotation rate may be adjusted using the average filling level of the buffer 29, e.g., by decreasing the rotation rate when the buffer is more than 50% full on average.

Figure 3:
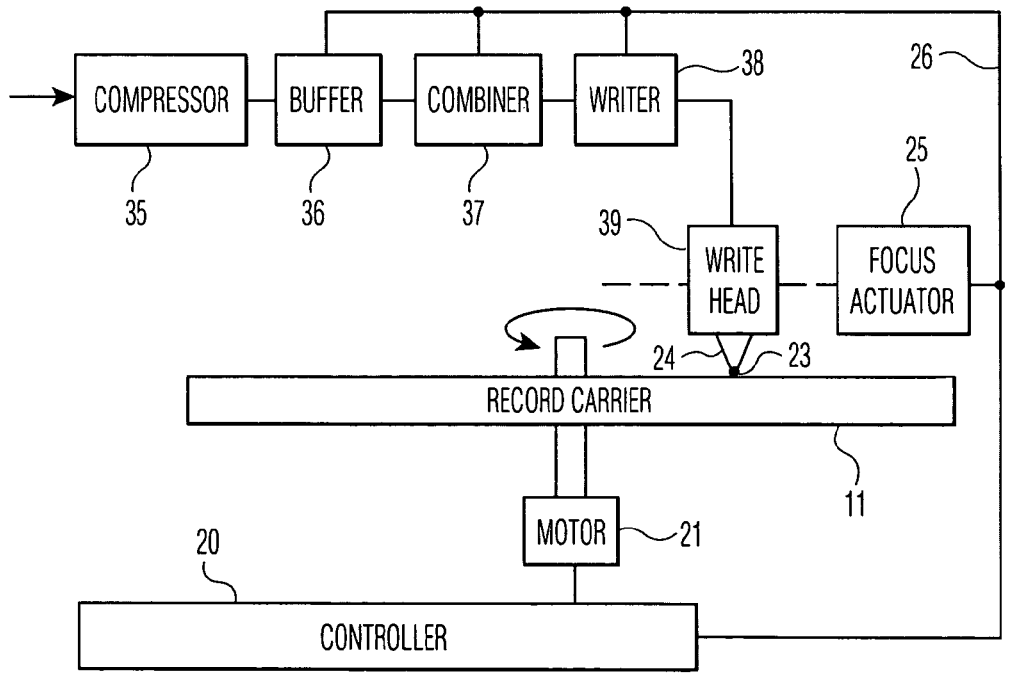
FIG. 3 shows a block diagram of a recording device.

FIG. 3 shows a recording device for writing information according to the invention on a record carrier 11 of a type which is (re)writable. During a writing operation, marks representing the information are formed on the record carrier. The marks may be in any optically readable form, e.g., in the form of areas whose reflection coefficient differs from their surroundings, through recording in materials, such as dye, alloy or phase change, or in the form of areas with a direction of magnetization different from their surroundings when recording in magneto-optical material. Writing and reading of information for recording on optical disks and usable rules for formatting, error correcting and channel coding, are well-known, e.g., from the CD system. Marks may be formed through a spot 23 generated on the recording layer via a beam 24 of electromagnetic radiation, usually from a laser diode. The recording device comprises similar basic elements as described with reference to FIG. 2, i.e., a control unit 20, drive means 21 and positioning means 25, but it has a distinctive write head 39. Audio information is presented on the input of compression means 35, which may be placed in a separate housing. Suitable compression has been described in documents D2, D3 and D4. The variable bit-rate compressed audio on the output of the compression means 35 is passed to buffer 36. From buffer 36, the data is passed to data combination means 37 for adding stuffing data and further control data. The total data stream is passed to writing means 38 for recording. Write head 39 is coupled to the writing means 38, which comprises, for example, a formatter, an error encoder and a channel encoder. The data presented to the input of writing means 38 is distributed over logical and physical sectors according to formatting and encoding rules and converted into a write signal for the write head 39. Unit 20 is arranged for controlling buffer 36, data combination means 37 and writing means 38 via control lines 26, and for performing the positioning procedure as described above for the reading apparatus. Alternatively, the recording apparatus may be arranged for reading having the features of the playback apparatus and a combined write/read head.

FIG. 4 is a layout of a linear physical storage space. Upper trace 50 shows the distribution of the audio stream into so-called Audio Units. For the Audio Units, analog audio may be sampled to produce one-bit signals at a multiple of 44.1 kHz, which is the standard sampling frequency of Compact disc. When the multiplicity is 64-fold, stereo quality requires a data rate of about 5.6 Mbits/second. A tighter format is attained through lossless audio coding to increase storage density by a factor of about 2, but, as shown in FIG. 1, this will produce Audio Units N−1 to N+2 that can have mutually non-uniform sizes. On the other hand, storage on a unitary medium, such as disc or tape, or transmission via a physical transmission medium is preferably organized in compartments that have mutually uniform dimensions, which has been indicated by blocks or sectors M−1 to M+4 on line 54. For enabling fast access to the blocks, each block has a header h, which, during reading, will obviate the need to parse the audio stream. Various blocks, such as blocks M+1 and M+2, accommodate an audio packet from only a single Audio Unit, such as, in this case, Audio Unit N. However, maximum storage density is attained as shown through joining various audio packets into a single storage block, such as joining audio packets N−1,1 and N,0 into block M, and also packets N,3, N+1,0 and N+2,0 into block M+3. In FIG. 4, the packets as shown on line 52 have, as first index, the number of their Audio Unit, and, as second index, the number within their audio block (running from 0 upwards). As shown, packets have a maximum size so that a packet will always fit into a single standard-sized block. On the other hand, the minimum size of a packet is down to an applicable granularity level of the storage-per-block. The number of packets per Audio Unit has an upper bound that is determined only by the maximum size of an Audio Unit.

Figures 5, 6:
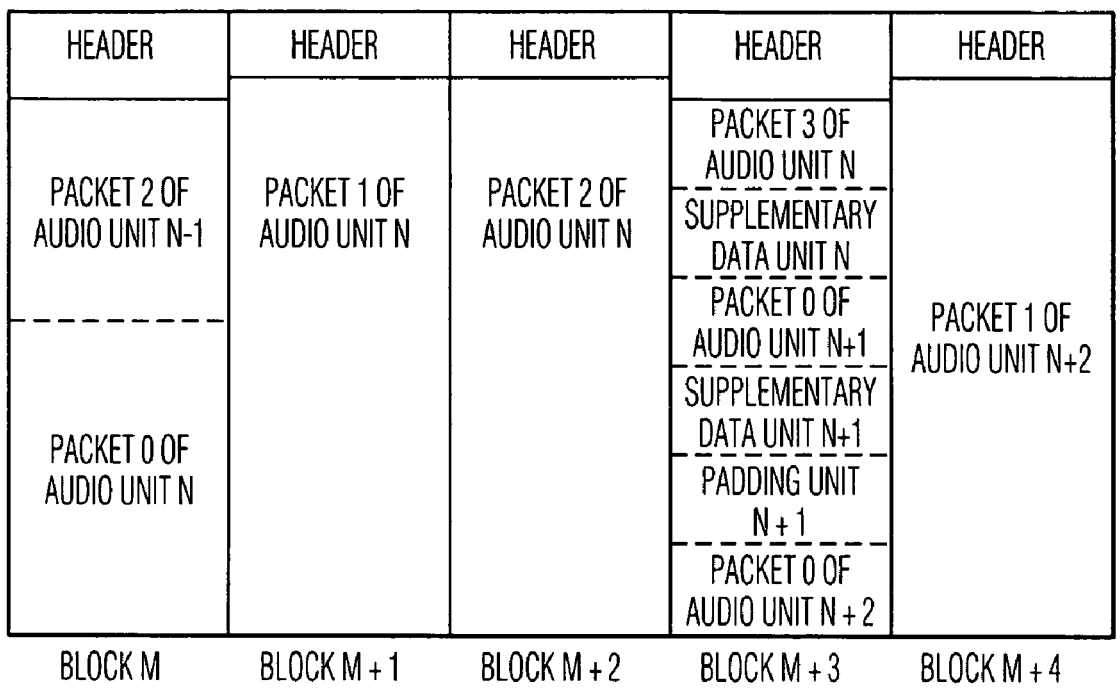
FIG. 5 shows a table of a storage format according to the invention.
FIG. 6 shows a syntax of an audio stream.

FIG. 5 shows a table of the storage format according to the invention, for the same configuration as shown in FIG. 4. Here, each column pertains to a single block M to M+4. Each block starts with a header area, that may have a non-uniform size. Furthermore, each block contains an integer number of packets that may have mutually non-uniform sizes. In addition to the Audio Units, the storage may contain one or more Supplementary Data Units as accessory to a particular Audio Unit, and one or more padding or stuffing units as further accessory to a particular Audio Unit. Padding renders the bit rate constant, and represents dummy data for maintaining an appropriate buffer filling degree. Supplementary data may pertain to an arbitrary layer of functionality, such as the subcode.

An Audio Unit or a frame may start on any position within a particular Block. Audio Units may transgress the edge of a Block, and in the embodiment, an Audio Unit will, in general, be larger than one Block. However, an Audio Unit may be so short that it would fit within a single Block. A single Block could therefore contain the starting point of a plurality of Audio Units. A frame relates to an actual duration of audio at replay, to wit, 1/75 of a second. Next to audio, it contains various informations that pertain to its audio. A sector also has an integer number of packets.

FIG. 6 illustrates the syntax of an audio stream according to the invention, written in the well-known Computer Language C. The first part relates to the Audio Mux Stream that contains a looped specification of Audio Blocks numbering 0 . . . N. Note that in the disclosure, N indicates an arbitrary parameter. The number of bits (right hand column) of the block in question is defined by the block length. The second part of the Table is again in C, and relates to a single Audio Block that contains an Audio Block Header and a looped specification of Packets numbering 0 . . . N. The number of bits of the packet in question is defined by its length. As recited, the data may have one of a plurality of respective data types.

FIG. 7 shows a header format of a preferred but exemplary embodiment according to the invention, again written in C. The numbers of bits of the various parts have been specified in the right hand column. The first bit indicates whether the block in question contains the beginning point of an Audio Unit. If positive, the following 48 bits specify various parameters of this Audio Unit, to wit: a single bit that indicates the effective start of this Audio Unit, a 30-bit time code for use by a reader device to effect functions such as jumping by a prespecified amount of time. The second part of the header is always present. In the first place, it specifies the distance measured in number of blocks, up to 15, until the next Audio Unit start, to allow a logic jump to the next Audio Unit. Each unit is linked to a single time code, and vice versa. Functionally, the storage may be multiplexed among audio units, padding units, and supplementary data units.

In consequence, going to a particular unit may simply be effected by waiting for a predetermined time interval until passage of the storage area of this next unit, through the continuing drive motion of a storage medium, such as a disc. Often, cross-track jumping will speed-up this process, but it even applies if, for some reason, such cross-track jumping would not be allowed. Further, the header specifies the number of Packets within the block by 3 bits. Next, for each such packet, there is a looped specification of the data_type of that packet through 5 bits, and of its length in 11 bits. Also the number of packets is therefore codetermining for the length of the header in question. Generally, there is a two-level addressing organization: first the correct sector or block is addressed, through the next_unit_indicator. Subsequently, local addressing is effected, through the local block header that indicates the address, such as through signalling the lengths of one or more packets.

FIG. 8 shows a table of the data type specification through the 5 bits indicated therefor by the table shown in FIG. 7. Various ones of the 32 combinations have been reserved. Five are used for specifying various coding types. One indicates the occurrence of CD-text. The remainder has been reserved.

FIG. 9 shows an audio block header syntax. The names of the various items, the numbers of bits, the format, and if applicable, the values have been indicated. The frame info can contain a time code. Note that the next unit indicator of Table 3 has been suppressed.

FIG. 10 shows a packet information syntax. The names of the various items, the lengths in bits, the format, and if applicable, the values have been indicated.

FIG. 11 shows a different data type definition, as varying from the table in FIG. 8. The various types of audio packets can now be defined in the applicable area_TOC. Note that CD TEXT corresponds to a supplementary data packet.

LIST OF RELATED DOCUMENTS (D1) Research Disclosure number 36411, August 1994, page 412–413

(D2) PCT/IB97/01156, corresponding to U.S. Pat. No. 6,778,965 (PHN 16.452) 1 bit ADC and lossless compression of audio (D3) PCT/IB97/01303, corresponding to U.S. Pat. Nos. 6,289,306 and 6,535,845 (PHN 16.405) Audio compressor (D4) EP-A 402,973, corresponding to U.S. Pat. Nos. 5,323,396, 5,606,618 (and others) (PHN 13.241) Audio compression (D5) 'A digital decimating filter for analog-to-digital conversion of hi-fi audio signals', by J. J. van der Kam in Philips Techn. Rev. 42, no. 6/7, April 1986, pp. 230–8

(D6) 'A higher order topology for interpolative modulators for oversampling A/D converters', by Kirk C. H. Chao et al in IEEE Trans. on Circuits and Systems, Vol 37, no. 3, March 1990, pp. 309–18.

The invention claimed is:

1. A playback device for playing back digital audio information signals partitioned along a string of uniform-sized blocks, the digital audio information signals representing variable-rate encoded audio information, arranged in successive non-uniform sized audio units, wherein an audio unit contains audio data for replay for a predetermined duration, the blocks include block headers containing information related to the audio units in a block, the audio units are divided in successive non-uniform sized audio packets having a size not larger than the size of a block for fitting one or more audio packets into a block, the audio packets are distributed among the blocks, and the block header indicates the actual content of each block of multiple blocks with respect to the presence of the start of an audio unit in the block, said playback device comprising:

reading means for reading said string of uniform-sized blocks;

data selection means for selecting one or more of said blocks containing an audio unit, and for determining a location of a start of said audio unit in one block of said one or more of said blocks using the block headers of the blocks; and assembling means for assembling subsequent audio packets in said one or more of said blocks to form said audio unit using said block headers.

2. The playback device as claimed in claim 1, wherein the data selection means determines the presence of a start of an audio unit in a block using a logical non-audio unit start indicator present in a block header.

3. The playback device as claimed in claim 1, wherein the data selection means determines the presence of a start of an audio unit in an audio packet using a logical packet audio unit start indicator present in a block header.

4. The playback device as claimed in claim 1, wherein the date selection means detects a next following audio unit using a pointer in a block header pointing to a block containing the start of the next following audio unit.

5. The playback device as claimed in claim 1, wherein the date selection means selects a time code of a particular audio unit comprised in a block header for effecting a jump by a pre-specified amount of time.

6. The playback device as claimed in claim 1, wherein the predetermined duration of replay of the audio information contained in the audio units is the same for multiple audio units.

* * * * *